V. K. STURGES.
TIRE PROTECTOR.
APPLICATION FILED DEC. 10, 1912.
1,077,440.
Patented Nov. 4, 1913.
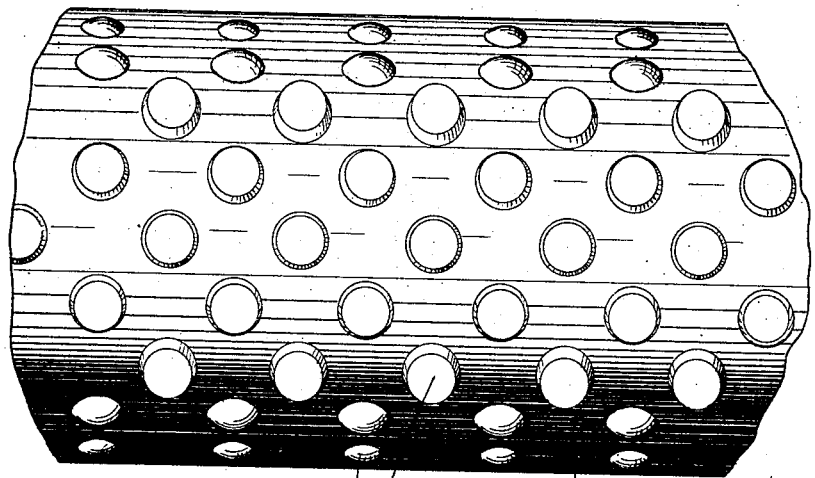
Fig.1.
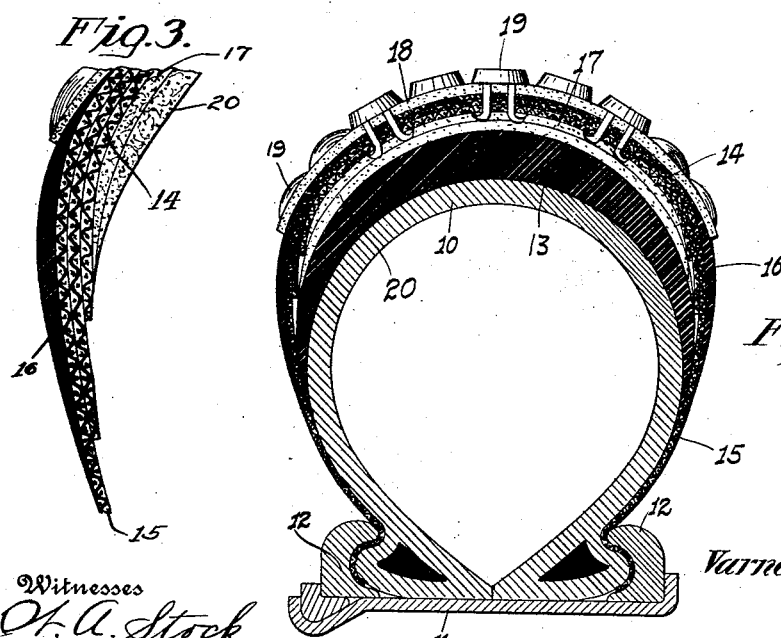
Fig.3.
Fig.2.
Witnesses
O. A. Stock
Frank H. Carter
Inventor
Varney K. Sturges.
By Harry C. Schroeder
Attorney

UNITED STATES PATENT OFFICE.

VARNEY K. STURGES, OF OAKLAND, CALIFORNIA.

TIRE-PROTECTOR.

1,077,440.

Specification of Letters Patent.

Patented Nov. 4, 1913.

Application filed December 10, 1912. Serial No. 735,938.

*To all whom it may concern:*

Be it known that I, VARNEY K. STURGES, a citizen of the United States, residing at Oakland, in the county of Alameda and State of California, have invented certain new and useful Improvements in Tire-Protectors, of which the following is a specification.

This invention relates to tire protectors, and the principal object of the invention is to provide a protector which will be securely held to the tire which will prevent nails and other sharp objects from cutting through the tire, thus puncturing the same.
Another object of the invention is to provide a structure which will reinforce the side portions of the protector, thus causing it to be strengthened, and also causing it to more securely grip the tire.
With these and other objects in view this invention consists of certain novel combinations, constructions, and arrangements of parts as will be hereinafter fully described and claimed.
In the accompanying drawing:—Figure 1 is a fragmentary plan view of the protector looking at the outer surface. Fig. 2 is a transverse sectional view through the tire and wheel rim with the protector in place.
Fig. 3 is an enlarged fragmentary sectional view of the side portion of the tire protector.

Referring to the accompanying drawing it will be seen that this invention comprises a tire 10 which is secured to the rim 11 by the usual rings 12 and which is provided with a thickened thread 13. The protector extends around the tire and comprises a fabric body portion 14 formed from layers of canvas or other suitable fabric which is soaked with rubber and then baked to vulcanize the rubber. The outer layer 15 of fabric extends down the sides of the tire and is engaged by the clamping rings 12 in order that the protector will be securely fastened to the tire. Reinforcing bands 16 of rubber or other suitable composition are formed upon the sides of the protector and extend partially around the tread in order that the protector may be strengthened and also to cause the side portions of the protector to have elasticity, thus causing the protector to grip the tire and assist in holding the protector to the tire. Inner and outer rings 17 and 18 of leather or other suitable material are placed along the tread portion of the protector and are secured in place by rivets 19 which preferably are provided with two or more securing prongs extending through the inner layer 17. These rivets not only hold the inner and outer layers of the protector to the body portion, but also form means to prevent the wheels from skidding. It should be noted that the heads of the rivets on the tread of the tire are flat or cup shape and that the ones along the sides are provided with curved heads as clearly shown in Figs. 1 and 2. The protecting layer 20 of leather or fabric is placed in the protector to cover the points of the rivet prongs, thus preventing the prongs from cutting the tire. It should be noted that the side portions of the outer layer 18 extends partially across the side strips 16, and that this prevents the side strips from being worn or caused to work loose. A protector has, therefore, been provided which will prevent the tire from being punctured and which will be securely held to the tire by having the outer layer 15 of fabric engaged by the securing bands, and also by the resilient strips 16 which not only assist in securing the protector to the tire, but also assist in preventing the tire from bending, thus bracing the tire and preventing cracking at the sides and also preventing damage if the air in the tire escapes out.

Having thus described the invention what is claimed as new, is:—

1. A tire protector comprising a fabric body portion, inner and outer strips positioned along the tread portion of said body portion, securing rivets having their prongs passing through said outer and inner strips to secure the same to said body portion, resilient strips formed along the side portions of said protector and extending beneath the side portion of said outer protecting strip, and a strip placed in the tread portion of said protector to cover the points of said rivets.

2. A tire protector comprising a body portion, inner and outer bands extending around the tread portion of said protector and secured to said body portion, and resilient reinforcing strips formed upon the side portions of said body portion for holding said protector to a tire and extending beneath the side portions of said outer band to protect said side strips from wear.

In testimony whereof I affix my signature in presence of two witnesses.

VARNEY K. STURGES.

Witnesses:
W. A. STOCK,
H. W. STALEY.